Nov. 2, 1926.
A. F. ERICKSON
VALVE
Filed Jan. 31, 1924
1,605,824
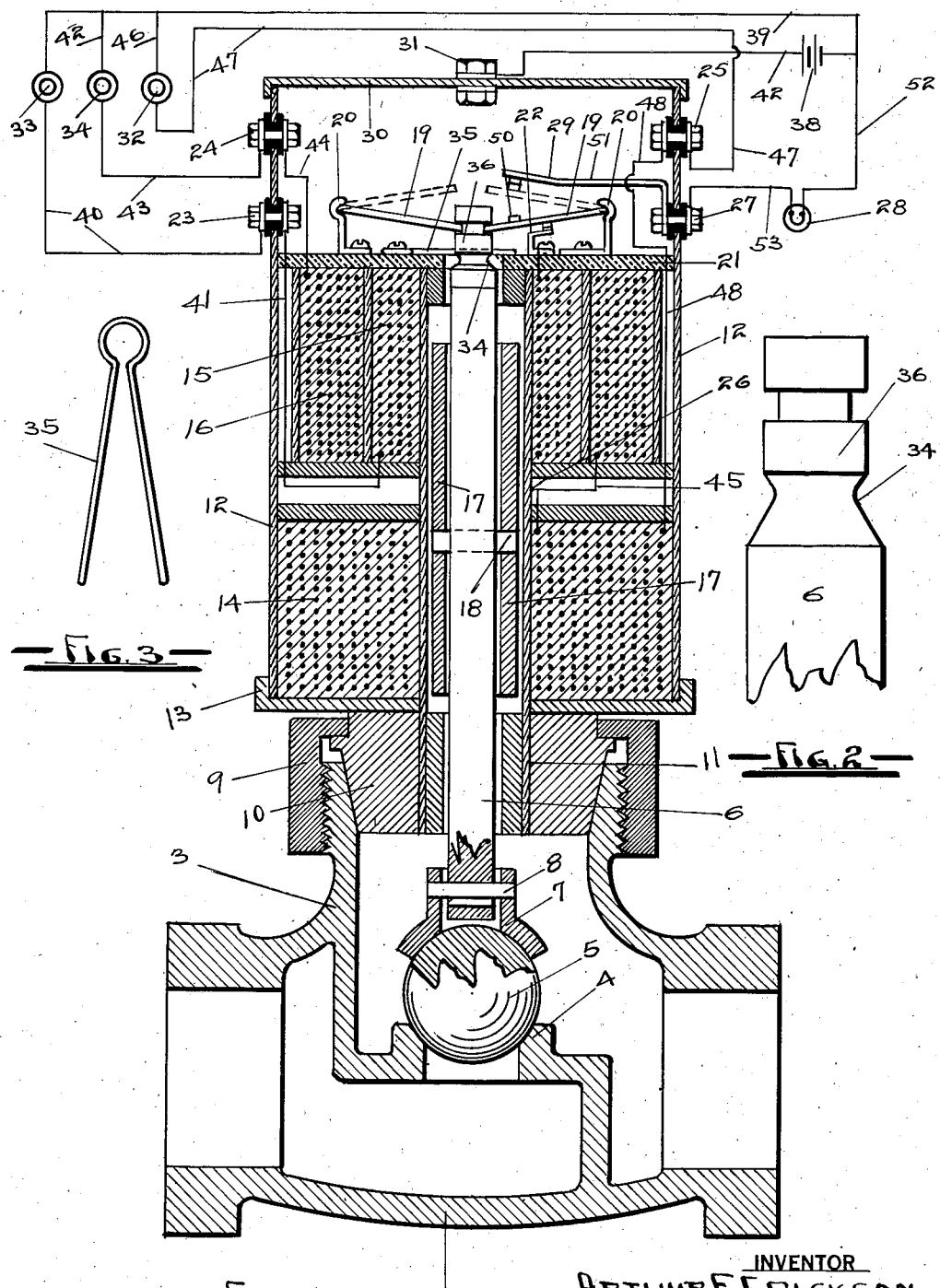
INVENTOR
ARTHUR F. ERICKSON
BY
C. F. Blake
ATTORNEY Patented Nov. 2, 1926.

1,605,824

UNITED STATES PATENT OFFICE.

ARTHUR F. ERICKSON, OF PORTLAND, OREGON.

VALVE.

Application filed January 31, 1924. Serial No. 689,654.

My invention relates to valves in general, and particularly to electrically operated valves, the object being to provide a valve that may be operated by electric push buttons or similar devices, and that may be partially opened, completely opened, or closed by operating a push button respective to the operation desired at the valve.

I accomplish this object by means of the construction illustrated in the accompanying drawing, which is a part of this application for Letters Patent, like characters of reference indicating like parts throughout the several views therein, and in which:

Fig. 1 is a sectional elevation of my device.

Fig. 2 is a fragmentary enlarged view of the upper end of the valve stem.

Fig. 3 is an enlarged view of the stem retaining spring.

In general my device consists of a valve of the globe valve type with a ball valve cooperating with a metal seat therein; a pair of axially alined solenoids mounted within a gas tight casing secured to the body of the valve; a valve stem projecting through said solenoids; a plunger common to both solenoids and mounted upon the valve stem; yieldable toggle mechanism within said casing and connected with the valve stem to accelerate the movement of the same and to hold the same at either end of its path of travel independently of the solenoids; a third solenoid surrounding one of the previously mentioned solenoids and adapted to partially open the valve, and a spring adapted to retain the valve in such partially open condition.

The valve body 3 is preferably of the globe valve type as shown, having a ground metallic seat 4 upon which is seated the ball valve 5. Said ball valve is freely mounted upon a valve stem 6 so that it may have a limited movement in all directions independently of any movement of the stem. I accomplish this by soldering, or otherwise securing, a flange 7 upon the ball valve 5, and securing said flange to the stem 6 by means of a pin 8. The stem 6 is a loose fit within the flange 7, and the pin 8 is a loose fit within the stem 6, and thus the ball valve 5 is allowed a limited movement independently of the stem 6.

Mounted upon the valve body, by means of a nut 9, is a plug 10, which fits the valve body with a gas tight ground joint, preferably conical, as shown in Fig. 1. A centrally disposed tube 11 is secured to the plug 10, and is axially alined with the seat of the valve 5, and extends above the plug 10. An outer shell 12 surrounds the tube 11 and is spaced apart therefrom. Said shell is secured to the plug 10 in a gas tight manner. This is accomplished preferably by making the shell cylindrical in form and providing a flanged or disk washer at the lower end thereof, said shell and washer being soldered together, and said washer being soldered upon the plug 10.

A pair of axially alined solenoids 14 and 15 are disposed within the shell 12 and surrounding the tube 11, and the valve stem 6 passes upward through said solenoids to terminate above the same in a grooved end as shown in Figs. 1 and 2. These solenoids operate respectively the closing and the partial opening of the valve, as hereinafter to be described. A third solenoid is provided surrounding the upper solenoid 15, as shown at 16, for the purpose of fully opening the valve. Thus there are three coaxial solenoids, one to open the valve partially, one to open it fully, and one to close it.

These solenoids are provided with a common plunger which is of tubular form as shown at 17, and which is secured to the valve stem by a pin 18.

The shell 12 extends beyond the solenoids to form a chamber, preferably at the upper end thereof, as shown in Fig. 1, and within such chamber is disposed the yieldable toggle mechanism, and also a spring device for retaining the valve in partially opened position. The toggle mechanism consists of a pair of toggle arms 19 coacting with the slot at the upper end of the valve stem and having yieldable fulcrum brackets 20 secured upon an insulating diaphragm 21, which diaphragm closes the shell 12 above the solenoids 15 and 16, and forms the bottom of the chamber within which the toggle mechanism is disposed. An electrical contact member 22 is mounted upon the diaphragm 21 and is adapted to contact with one of the toggle arms 19. Said contact member is a terminal for the solenoid 15. Another terminal for the solenoid 15 is provided upon the shell 12 at 23. Similar terminals to 23 are provided at 24 and 25 for the solenoids 16 and 17 respectively, and these solenoids are grounded to the device as shown at 26.

A terminal 27 is provided similar to the terminals 23, 24, and 25, for the purpose of attaching a signal lamp 28 as hereinafter described. Said terminal 27 is provided with means for cooperating with one of the toggle arms 19, conveniently being an arm 29 with a contact point adapted to contact with a similar point upon said toggle arm.

A cover 30 is provided for the shell 12, and said cover is provided with a binding post 31 to which to attach a battery or other source of electrical energy. Push buttons 32, 33, and 34 operate solenoids 14, 15 and 16 respectively through circuits hereinafter described.

To secure the valve stem in position opening the valve partially I provide a cam-like groove 34 therein which cooperates with a hair-pin spring 35 secured upon the diaphragm 21. When the valve is closed said spring contacts with the head 36 of the valve stem above said cam-like slot 34; when the valve is partially open the spring lies within said cam-like slot 34 and holds the valve in partially open position; when the valve is fully open the spring contacts with the valve stem 6 immediately below the cam-like slot 34; and when the valve is closed the spring returns to its initial position on the head 36. The sides of the cam-like slot 34 are sufficiently sloping to allow the passage of the spring from one position to another without undue friction.

The operation of my device is as follows.

Let it be assumed that it is desired to open the valve partially. Then closing push button 33 closes a circuit from the battery 38 through wire 39, push button 33, wire 40, binding post 23, wire 41, solenoid 15, contact 22, toggle arm 19, valve stem 6 which is grounded to the structure, binding post 31, and wire 42 to the battery. This energizes the solenoid 15 and opens the valve until the spring 35 enters the cam-like slot 34. The strength of the solenoid 15 and of the spring 35 are so relatively proportioned that the spring retains the valve stem 6 against further pull of the solenoid, and thus the valve remains partially open.

If then, it is desired to further open the valve to its fullest extent, push button 34 is closed. This establishes a circuit from the battery 38 through wire 39, wire 42, push button 34, wire 43, binding post 24, wire 44, solenoid 16, grounded wire 45, and through the structure to binding post 31, and wire 42 to the battery. This energizes solenoid 16 and thus causes the full opening of the valve, the toggle arms 19 assuming the dotted position shown in Fig. 1, and thus holding the valve open.

When it is desired to close the valve push button 32 is closed, thus establishing a circuit from the battery 38 through wire 39, wire 46, push button 32, wire 47, binding post 25, wire 48, solenoid 14, ground at 26, through the structure to the binding post 31, and wire 42 to the battery.

This energizes the solenoid 14 and causes the valve to close.

It will be readily understood that if it is desired to fully open the valve from closed position it may be accomplished by operating push button 34 without having first operated push button 33. In such case the valve stem will travel its full distance, the spring 35 passing the slot 34, since the relative strengths of the solenoid 14 and the spring 35 are such that the solenoid causes the valve stem to pass the cam like slot 34 past the spring 35. This also happens when closing the valve.

An indicator light 28 is provided to show when the valve is open. When the valve is open a contact point 50 upon one of the toggle arms 19 contacts with a similar point upon an arm 51, and thus closes a circuit from the battery 38 through wire 42, terminal 31, cover 30, shell 12, base 13, tube 11 and its top closure plug, armature 17 as it contacts with said closure plug, pin 18, stem 6, toggle means 19, contact 50, contact member 29, terminal 27, wire 53, signal lamp 28, and wire 52 to the battery. Thus the light 28 will be lighted when the valve is open.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A valve body; a casing mounted upon said body in a gas tight manner; a pair of axially alined solenoids within said casing; a third solenoid surrounding one of said axially alined solenoids, a plunger common to all said solenoids, a valve; a valve stem operated by said solenoids; yieldable toggle mechanism mounted within a chamber formed by a prolongation of said casing beyond said solenoids; an electric contact member cooperating with one of said toggle arms and connected to the upper of said axially alined pair of solenoids; ground connections for the lower of said pair of axially alined solenoids and said third solenoid; and a push button controlled electric circuit respective to each of said solenoids.

2. A valve body; a valve within said body; a gas tight casing upon said body; electrical mechanism within said casing for partially opening said valve; electrical mechanism within said casing for fully opening said valve; electrical mechanism within said casing for closing said valve; snap acting mechanism within said casing cooperating with said electrical mechanisms to operate said valve; and mechanism to retain said valve in partially opened position.

3. A valve; a solenoid operating to partially open said valve; a solenoid operating to completely open said valve; a solenoid operating to close said valve; mechanism to hold said valve in partially open position; and mechanism to hold said valve in completely open position.

4. A valve; a gas tight casing upon said valve; a solenoid in the bottom of said casing adapted to close said valve; a solenoid in the top of said casing adapted to partially open said valve; and a solenoid surrounding said top positioned solenoid, and adapted to completely open said valve.

5. A valve; electric mechanism for partially opening said valve; electric mechanism for completely opening said valve; electric mechanism for closing said valve; and mechanism for holding said valve in said positions.

6. A valve; a casing mounted upon said valve; and a trinity of concentrically mounted solenoids within said casing, one of said solenoids being adapted to partially open said valve, one to completely open said valve, and one to close said valve.

7. A valve; a trinity of electrical circuits to operate said valve, each of said circuits containing a push button, and a solenoid, one of said circuits operating to partially open the valve, one to completely open the valve, and one to close the valve; and means for retaining the valve in said positions after the operation of the respective electrical circuits.

In witness whereof I claim the foregoing as my own I hereunto affix my signature at Portland, county of Multnomah, State of Oregon, this 26 day of Jan., 1924.

ARTHUR F. ERICKSON.